US007887867B2

(12) United States Patent
Abboud et al.

(10) Patent No.: US 7,887,867 B2
(45) Date of Patent: Feb. 15, 2011

(54) STABILIZED NON-SOUR DAIRY BASE MATERIALS AND METHODS FOR PREPARATION

(75) Inventors: Amna M. Abboud, Germantown, TN (US); Gary W. Trecker, McHenry, IL (US); Alice S. Cha, Northbrook, IL (US); Jimbay P. Loh, Green Oaks, IL (US); Daniel A. Meyer, Park Ridge, IL (US)

(73) Assignee: Kraft Foods Global Brands LLC, Northfield, IL (US)

( * ) Notice: Subject to any disclaimer, the term of this patent is extended or adjusted under 35 U.S.C. 154(b) by 1262 days.

(21) Appl. No.: 11/207,745

(22) Filed: Aug. 22, 2005

(65) Prior Publication Data

US 2006/0034994 A1    Feb. 16, 2006

Related U.S. Application Data

(63) Continuation-in-part of application No. 10/956,907, filed on Oct. 1, 2004, now abandoned, which is a continuation-in-part of application No. 10/784,404, filed on Feb. 23, 2004, now abandoned, and a continuation-in-part of application No. 10/784,699, filed on Feb. 23, 2004, now abandoned.

(51) Int. Cl.
*A23C 9/00*    (2006.01)
(52) U.S. Cl. ..................................... 426/580; 426/586
(58) Field of Classification Search .................. 426/34, 426/580, 583, 586, 587, 654, 656, 657
See application file for complete search history.

(56) References Cited

U.S. PATENT DOCUMENTS

| 751,179 | A | 2/1904 | Kollrepp et al. |
|---|---|---|---|
| 2,848,403 | A | 8/1958 | Rosenberg |
| 3,165,415 | A | 1/1965 | Kilburn et al. |
| 3,300,473 | A | 1/1967 | Christoffel |
| 3,615,664 | A | 10/1971 | Francis |
| 3,616,385 | A | 10/1971 | Kloss et al. |
| 3,705,846 | A | 12/1972 | Kato et al. |
| 3,845,226 | A | 10/1974 | Goujard |
| 3,876,805 | A | 4/1975 | Craig et al. |
| 3,882,250 | A | 5/1975 | Loter et al. |
| 3,922,353 | A | 11/1975 | Bernotavicz |
| 3,922,375 | A | 11/1975 | Dalan et al. |
| 3,955,010 | A | 5/1976 | Chozianin et al. |
| 3,995,071 | A | 11/1976 | Goodnight, Jr. et al. |
| 4,043,896 | A | 8/1977 | Ahlgren |
| 4,053,643 | A | 10/1977 | Corbin, Jr. et al. |
| 4,072,670 | A | 2/1978 | Goodnight, Jr. et al. |
| 4,088,795 | A | 5/1978 | Goodnight, Jr. et al. |
| 4,091,120 | A | 5/1978 | Goodnight, Jr. et al. |
| 4,111,772 | A | 9/1978 | Horn |
| 4,138,501 | A | 2/1979 | Chaveron et al. |
| 4,146,455 | A | 3/1979 | McRaei |
| 4,232,050 | A | 11/1980 | Rule et al. |
| 4,238,307 | A | 12/1980 | Perry et al. |
| 4,312,891 | A | 1/1982 | Eisfeldt |
| 4,317,841 | A | 3/1982 | Brambilla et al. |
| 4,322,275 | A | 3/1982 | Jain |
| 4,351,710 | A | 9/1982 | Jain |
| 4,352,826 | A | 10/1982 | Pearline et al. |
| 4,374,152 | A | 2/1983 | Loter |
| 4,420,425 | A | 12/1983 | Lawhon |
| 4,612,203 | A | 9/1986 | Wong et al. |
| 4,693,901 | A | 9/1987 | Hullah |
| 4,818,554 | A | 4/1989 | Giddey et al. |
| 4,828,852 | A | 5/1989 | Hsu et al. |
| 4,919,964 | A | 4/1990 | Adams et al. |
| 4,927,657 | A | 5/1990 | Antaki et al. |
| 4,936,962 | A | 6/1990 | Hatzidimitriu |
| 4,938,856 | A | 7/1990 | Hatzidimitriu |
| 4,971,701 | A | 11/1990 | Harju et al. |
| 5,013,573 | A | 5/1991 | Bodor et al. |
| 5,057,330 | A | 10/1991 | Lee et al. |
| 5,221,554 | A | 6/1993 | Gamay |
| 5,252,352 | A | 10/1993 | Banach et al. |
| 5,260,080 | A | 11/1993 | Noel |
| 5,268,079 | A | 12/1993 | Ochoa Gomez et al. |
| 5,277,926 | A | 1/1994 | Batz et al. |
| 5,332,587 | A | 7/1994 | Howard et al. |
| 5,397,445 | A | 3/1995 | Umemura et al. |

(Continued)

FOREIGN PATENT DOCUMENTS

| CN | 1242171 | 1/2000 |
|---|---|---|
| EP | 0109868 A1 | 5/1984 |
| EP | 0171995 A2 | 2/1986 |
| EP | 0233566 A2 | 8/1987 |
| EP | 0415787 A1 | 3/1991 |
| EP | 0605160 A1 | 7/1994 |
| EP | 0642824 A1 | 3/1995 |
| EP | 0489811 B1 | 10/1995 |
| EP | 0717596 B1 | 11/1997 |
| EP | 0275717 A1 | 7/1998 |
| EP | 1104245 A1 | 6/2001 |
| EP | 0809442 B1 | 10/2001 |

(Continued)

OTHER PUBLICATIONS

Quoc et al., *Acceleration of pH Variation in Cloudy Apple Juice Using Electrodialysis with Bipolar Membranes*, J. Agric. Food Chem,, 48(6), 2160-2166, 2000.

(Continued)

*Primary Examiner*—Leslie Wong
(74) *Attorney, Agent, or Firm*—Fitch, Even, Tabin & Flannery

(57) ABSTRACT

The present invention is directed to stabilized non-sour dairy base materials which may be used as a heavy cream substitute or other culinary purposes in food products.

18 Claims, 5 Drawing Sheets

U.S. PATENT DOCUMENTS

| | | | |
|---|---|---|---|
| 5,426,219 | A | 6/1995 | Lehnhardt et al. |
| 5,599,573 | A | 2/1997 | Barnes et al. |
| 5,658,714 | A | 8/1997 | Westfall et al. |
| 5,670,197 | A | 9/1997 | Adrianson et al. |
| 5,683,737 | A | 11/1997 | Erickson et al. |
| 5,702,745 | A | 12/1997 | Yang et al. |
| 5,746,920 | A | 5/1998 | Boergardts et al. |
| 5,773,063 | A | 6/1998 | Knueven |
| 5,817,356 | A | 10/1998 | Gum et al. |
| 5,922,381 | A | 7/1999 | Bajracharya et al. |
| 5,958,491 | A | 9/1999 | Knueven |
| 6,001,405 | A | 12/1999 | Bajracharya et al. |
| 6,110,509 | A | 8/2000 | Nauth et al. |
| 6,132,792 | A | 10/2000 | Knueven et al. |
| 6,187,357 | B1 | 2/2001 | Meyer et al. |
| 6,203,840 | B1 | 3/2001 | Meyer et al. |
| 6,204,362 | B1 | 3/2001 | Kitamura et al. |
| 6,221,225 | B1 | 4/2001 | Mani |
| 6,245,370 | B1 | 6/2001 | Pilati et al. |
| 6,261,624 | B1 | 7/2001 | Hudson et al. |
| 6,319,382 | B1 | 11/2001 | Norddahl |
| 6,326,048 | B1 | 12/2001 | Kato et al. |
| 6,402,917 | B1 | 6/2002 | Emery et al. |
| 6,413,561 | B1 | 7/2002 | Sass et al. |
| 6,461,491 | B1 | 10/2002 | Hryn et al. |
| 6,482,305 | B1 | 11/2002 | Mani |
| 6,537,436 | B2 | 3/2003 | Schmidt et al. |
| 6,565,725 | B2 | 5/2003 | Sugaya et al. |
| 6,579,551 | B1 | 6/2003 | Theuer et al. |
| 6,620,445 | B1 | 9/2003 | Knueven |
| 6,667,068 | B2 | 12/2003 | Smith |
| 6,733,805 | B1 | 5/2004 | Loisel et al. |
| 6,767,575 | B1 | 7/2004 | Huss et al. |
| 6,787,173 | B2 | 9/2004 | Akashe et al. |
| 6,863,908 | B2 | 3/2005 | Hamm et al. |
| 6,893,675 | B1 | 5/2005 | Jacobson et al. |
| 6,905,721 | B2 | 6/2005 | Jacobson et al. |
| 7,045,163 | B2 | 5/2006 | Akashe et al. |
| 7,094,439 | B2 | 8/2006 | Akashe et al. |
| 7,108,881 | B2 | 9/2006 | Akashe et al. |
| 7,150,894 | B2 | 12/2006 | Cha et al. |
| 2001/0002267 | A1 | 5/2001 | Rapaport |
| 2001/0018087 | A1 | 8/2001 | Coleman et al. |
| 2001/0037942 | A1 | 11/2001 | Schmidt et al. |
| 2001/0040093 | A1 | 11/2001 | Mani |
| 2002/0039613 | A1 | 4/2002 | Bhatia et al. |
| 2002/0102339 | A1 | 8/2002 | Akashe et al. |
| 2004/0101613 | A1 | 5/2004 | Levi |
| 2004/0151803 | A1 | 8/2004 | Wolfschoon-Pombo et al. |
| 2004/0161513 | A1 | 8/2004 | Akashe et al. |
| 2004/0170747 | A1 | 9/2004 | Sekula et al. |
| 2004/0253355 | A1 | 12/2004 | Akashe et al. |
| 2005/0058761 | A1 | 3/2005 | Lightfield et al. |
| 2006/0024412 | A1 | 2/2006 | Cha et al. |
| 2006/0034994 | A1 | 2/2006 | Abboud et al. |
| 2007/0082095 | A1 | 4/2007 | Loh et al. |

FOREIGN PATENT DOCUMENTS

| | | | |
|---|---|---|---|
| EP | 1249176 | A1 | 10/2002 |
| EP | 1338209 | A1 | 8/2003 |
| EP | 1440623 | A1 | 7/2004 |
| EP | 1568287 | A1 | 8/2005 |
| FR | 2514615 | A1 | 4/1983 |
| FR | 2674848 | A1 | 10/1992 |
| GB | 700542 | A | 12/1953 |
| JP | 60114392 | A2 | 6/1985 |
| JP | 63100996 | A | 5/1988 |
| JP | 4108353 | A2 | 4/1992 |
| JP | 04278057 | A | 10/1992 |
| JP | 6113769 | A2 | 4/1994 |
| JP | 7042206 | A2 | 2/1995 |
| JP | 7274921 | A2 | 10/1995 |
| JP | 7289178 | A2 | 11/1995 |
| JP | 8131065 | A2 | 5/1996 |
| JP | 9070581 | A2 | 3/1997 |
| JP | 9164387 | A2 | 6/1997 |
| JP | 9187221 | A | 7/1997 |
| JP | 9316089 | A | 12/1997 |
| JP | 10262580 | A | 10/1998 |
| JP | 10262583 | A2 | 10/1998 |
| JP | 10327833 | A | 12/1998 |
| JP | 11137162 | A | 5/1999 |
| JP | 2000060512 | A2 | 2/2000 |
| JP | 2000139374 | A2 | 5/2000 |
| JP | 2000300193 | A2 | 10/2000 |
| JP | 2000312576 | A2 | 11/2000 |
| JP | 2001269668 | A | 10/2001 |
| JP | 2002112750 | A | 4/2002 |
| JP | 2002159260 | A | 6/2002 |
| WO | WO9103169 | A1 | 3/1991 |
| WO | WO9103171 | A1 | 3/1991 |
| WO | WO9319609 | | 10/1993 |
| WO | WO9403076 | A1 | 2/1994 |
| WO | WO9504468 | A1 | 2/1995 |
| WO | 95/33696 | A | 12/1995 |
| WO | 96/20890 | A | 7/1996 |
| WO | WO9624254 | A1 | 8/1996 |
| WO | 96/41021 | A | 12/1996 |
| WO | 98/28433 | A | 7/1998 |
| WO | 98/52422 | A | 11/1998 |
| WO | WO0008942 | A1 | 2/2000 |
| WO | WO0042854 | A1 | 7/2000 |
| WO | WO03011059 | A1 | 2/2003 |
| WO | 2005025332 | A1 | 3/2005 |
| WO | 2006039372 | A2 | 4/2006 |

OTHER PUBLICATIONS

Hagg et al., *Membranes in Chemical Processing, A Review of Applications and Novel Developments, Separation and Purification Methods*, 27(1), 51-168, 1998.

Shallenberger, R.S., *Taste Chemistry*, Blackie Academic & Professional, London, p. 290-291 and 450-451.

Touzopoulou et al., Effect of Heating and Acid on the Yield and Quality of Cheese Produced From UF-Concentrated Whey, vol. 55, No. 6, 2000, pp. 322-325.

AFP Advanced Food Products, LLC., Public Taste Testing of Imitation Cheese Sauce Products 1999.

Intellectual Property Office of New Zealand, Examination Report for New Zealand Patent Application No. 577399 dated Jun. 9, 2009, 3 pages.

B. Girard and L.R. Fukumoto, Membrane Processing of Fruit Juices and Beverages: A Review, Critical Reviews in Food Science and Nutrition, vol. 40(2), 2000, pp. 91-157.

K. Wucherpfennig and K. Keding, Ent- und Aufsäuern von Kern-, Beeren-, Steinobstsäften und Traubenmost mit Hilfe der Elektrodialyse, Flüssiges Obst, vol. 10, 1982, pp. 590-601.

F.P. Cuperus, et al., Applications of Membrane Technology to Food Processing. Trends in Food Science & Technology, 1993, vol. 4, pp. 277-282.

Jones-Hamilton Co., Acidulant Cuts Sweetener Use. Food Product Design, 2004, p. 111.

Jones-Hamilton Co., Acidulation Enters A New Phase. Food Product Design, 2004, p. 108.

Jones-Hamilton Co., New Acidulant Offers a Mellow Option. www.preparedfoods.com, 2003, p. 71.

Jones-Hamilton Co., Abstract, Food Product Design, 2003, p. 87.

ACIDIFIED SLURRY PREPARATION

Figure 3. Stabilized Dairy Material Preparation

STABILIZED NON-SOUR DAIRY BASE MATERIALS AND METHODS FOR PREPARATION

The present application is a continuation-in-part application of U.S. patent application Ser. No. 10/956,907 filed Oct. 1, 2004, now abandoned, which is a continuation-in-part application of U.S. patent application Ser. Nos. 10/784,404 and 10/784,699 both filed Feb. 23, 2004, both now abandoned, all of which are hereby incorporated by reference.

The present invention is directed to stabilized non-sour dairy base materials having extended refrigerated shelf-lives and methods for producing the stabilized non-sour dairy base materials, and food products which incorporate them.

BACKGROUND

A wide variety of popular food products are prepared with heavy cream, such as conventional savory sauce and dessert-type dairy products. Conventional natural heavy cream has a limited shelf-life, typically less than two weeks under refrigerated storage conditions, which often results in unused waste product. Food manufacturers ideally desire to produce finished food products which are both organoleptically-pleasing but also sufficiently shelf-stable. In general, food preservation has been generally approached in the past, for instance, via direct acidulation, thermal treatment, chemical preservatives, hydrostatic treatment, refrigeration and combinations thereof. The challenge that is often faced is improving shelf life without diminishing the desirable sensory attributes, and thus the commercial value, of the food.

Food processing often requires pH adjustments to obtain desired product stabilities. The direct addition of organic food acidulants to provide a shelf stable dairy product also may lead to problems which may include unacceptable sour taste, and/or isoelectric precipitation of casein leading to grainy texture, emulsion breakdown, etc., For instance, conventional acidified dairy creams, such as sour cream and cream cheese, prepared by acidifying sweet cream with an organic acid, e.g., lactic, citric, or acetic acid, have an objectionable sour taste or acidic bite imparted to the acidified cream, and also in finished food products incorporating the sour cream. While conventionally acidified (sour) cream may be acceptable for limited recipe preparations, it is mostly unacceptable due to objectionable sour taste. Conventional acidified dairy creams also tend to contain large proportions of water relative to the solids content.

Low cost, high quality dairy products are largely unavailable in shelf stable form. Processes such as retort treatment or aseptic packaging have been used to prepare shelf stable dairy products; these processes are, however, very costly. Others use intermediate moisture preservation technology mainly depending on the use of humectants (e.g. glycerol) and preservatives (e.g. high salt, sorbic acid) which yield high solid, inferior products (e.g. rubbery or candy-like texture, unacceptable taste). Use of natural antimicrobial agents, such as nisin, can be effective for extending shelf-life in foods, but may increase material costs.

Food products also have been significantly thermally processed (e.g., pasteurized, or receive a more extreme thermal treatment such as retort) to provide shelf stability. Thermal processing potentially complicates production, degrades nutrition value and adds to production costs. In addition, heat sensitive food products in particular may not tolerate pasteurization or other significant heat treatment used to stabilize the food composition without sacrificing desirable sensory attributes thereof, e.g., taste, mouthfeel, texture, color, odor or lack thereof, etc. For instance, certain widely used non-sweetened foods containing a dairy product (e.g., milk, cheese, butter, cream, dairy proteins, etc.), such as some salad dressings, dips, spreads, sauces, fall under this category, as undesirable or diminished desirable flavor and/or mouthfeel, etc., results from a significant heat treatment thereof.

New and simple methods are desired for the preparation of shelf-stable dairy base materials having no undesirable sour off-taste, especially those which are useful as a heavy cream replacement in producing food products having characteristics, such as flavor and texture, and process functionality similar to that of conventional heavy cream. The present invention provides a stabilized dairy base material having an extended shelf life and improved physical stability which can be easily processed with other ingredients in the production of various food products without imparting undesirable sourness, texture, or other adverse impacts upon sensory properties.

SUMMARY

According to the present invention, stabilized non-sour dairy base materials are provided which have extended refrigerated shelf-lives and no objectionable sour taste or other undesirable sensory properties.

In one embodiment, stabilized non-sour dairy base materials having extended refrigerated shelf-lives are provided that can be used as reduced-cost heavy cream substitutes or for other culinary purposes in food products while maintaining desirable flavor and texture characteristics in the finished food product. In a particular embodiment, the present invention enables the production of savory sauce and dessert-type dairy products using the stabilized non-sour dairy base materials of the invention to adjust the pH of the finished food product to a more stable, shelf-life extending acidic environment without imparting objectionable sourness, and while maintaining functional characteristics comparable to conventionally produced savory sauce and dessert-type dairy products.

In one embodiment, a stabilized non-sour dairy base material having acidic pH and an extended refrigerated shelf life is provided as a dairy emulsion comprising a non-sour acidified dairy slurry and optionally a cheese component. In one particular embodiment, a stabilized non-sour dairy base material is provided as an emulsion combining i) an acidified dairy slurry prepared with a non-sour acidulant and a dairy blend, and ii) a cheese component, wherein the non-sour acidulant is present in an amount providing a dairy base material with final pH of about 4.4 to about 5.0 and a shelf-life of at least about 30 (thirty) days under refrigerated conditions. The acidified dairy slurry may be combined with the cheese component in a weight ratio of about 20:80 to about 100:0, particulary about 40:60 to about 100:0, respectively. The finished dairy base material generally may contain about 25 to about 75 percent moisture and about 11 to about 65 percent fat, and particularly about 30 to about 70 percent moisture and about 20 to about 65 percent fat. In a particular embodiment, a stabilized non-sour dairy base material is provided having a refrigerated shelf life of at least about thirty (30) days, particularly at least about ninety (90) days, and more particularly at least about one-hundred twenty (120) days, which significantly exceeds the approximate eight to ten day shelf life of conventional heavy creams. The extended shelf-lives are provided in these products without need to include any secondary shelf-life preservative additives. Dairy base components i) and ii) are combined as a stable emulsion. The stable emulsion may be provided by homogenizing a blend of components i) and ii), although it has been determined that use of homogenization or other high shear mixing technique suitable for emulsification is not required if an effective amount of stabilizer (e.g., gum) is included in the dairy blend component of the dairy slurry. If a cheese component is not included in the formulation of the non-sour dairy base material, the acidified dairy slurry is formed as a stable emulsion, such as using methods indicated herein.

In another particular embodiment, a stabilized non-sour dairy base material is provided which does not include the cheese component. It can be used directly as a stabilized non-sour cream type product in finished foods. In this embodiment, a stabilized non-sour cream type product is provided directly by emulsification of an acidified dairy slurry which comprises a dairy fat source, a protein source, a non-sour acidulant, and water, with a pH between about 4.4 and about 5.0 and a shelf-life of at least about 30 days under refrigerated conditions, particularly at least about 120 days. In one particular embodiment, the finished stabilized non-sour dairy base material made without the cheese component has a total fat content of about 25 to 65 percent, a total moisture content of about 35 to 75 percent, and a solid non-fat content of about 4 to about 6 percent.

In addition to an absence of undesirable acidic bite or off-flavors, the stabilized non-sour dairy base material provided also is easily blendable with food ingredients, and is emulsion stable and freeze/thaw stable. The non-sour dairy material also contains a relatively larger proportion of solids content relative to moisture content, as compared to conventional heavy creams. The stabilized non-sour dairy base material is suitable for a wide variety of food products, such as sauces, gravies, spreads, dips, dressings, fillings, toppings, desserts, and the like as well as combinations thereof. The dairy base material is particularly useful as a reduced cost replacement for conventional heavy cream and half-and-half dairy products. The dairy base material provides added convenience and cost advantages in the preparation of cream-based sauces in particular, such as Alfredo sauces, when used as a replacement for at least part of the heavy cream requirements of the sauce recipes. In one embodiment, the food product is a dairy-based food product containing about 20 to about 80 percent stabilized non-sour dairy base material.

The non-sour acidulants useful to prepare the acidified dairy slurry of the dairy base material may be selected from edible metal acid salts of inorganic acids, edible inorganic acids, acidic electrodialyzed compositions (ED), or combinations of these. One or more of these kinds of acidulants are used in the dairy base material in amount effective for lowering the overall pH of a food product made therewith to extend shelf life under refrigerated storage conditions, making it possible to avoid using sour organic acids or other sour acidifying additives for that purpose.

The present invention also provides methods for making the stabilized non-sour dairy base materials and food products which incorporate them.

DETAILED DESCRIPTION

The present invention is concerned with stabilized non-sour dairy base materials, particularly those suitable for use as a heavy cream replacement or substitute in food products, or other culinary purposes, and methods of making same. The stabilized non-sour dairy base material is a savory, sweet cream, or dairy tasting product with a pH of about 4.4 to 5.0, particularly about 4.8 to about 5.0, having extended refrigerated shelf-life and which maintains and/or compliments flavor, texture, and functionality in finished foods, such as sauces and desserts. It will be appreciated that the compositions and methods of the present invention are applicable to many types of food products, including, but not limited to, those normally prepared containing heavy cream, such as savory sauce and dessert products.

As used herein "acidulant" refers to a pH-controlling agent which reduces pH of a food composition. "Non-sour" refers to the absence of objectionable sour taste, acidic bite or tartness. "Suitable for human consumption" means free from harmful or unapproved chemical or contaminants, toxins or pathogens, and objectionable flavor or taste or spoilage. "Shelf-life" means shelf life under refrigerated storage conditions unless otherwise indicated. "Product shelf life" is determined by evaluating at least organoleptic quality (i.e., taste, odor), and optionally also physical stability (emulsion stability, texture, viscosity, pH, syneresis, staling), and chemical stability (lipid oxidation, discoloration. Shelf life preferably is evaluated with reference or comparison to a control sample of relatively fresh conventional heavy cream. Unless otherwise specified herein, "refrigerated" generally refers to a product storage temperature below about 45° F., and can include freezing temperatures. However, in the context of prescribed shelf-life values, the shelf-life value is determined for product held at a storage temperature in the range of about 37 to about 42° F. "Product stability" is determined by safety or microbiological stability.

Figure 1:
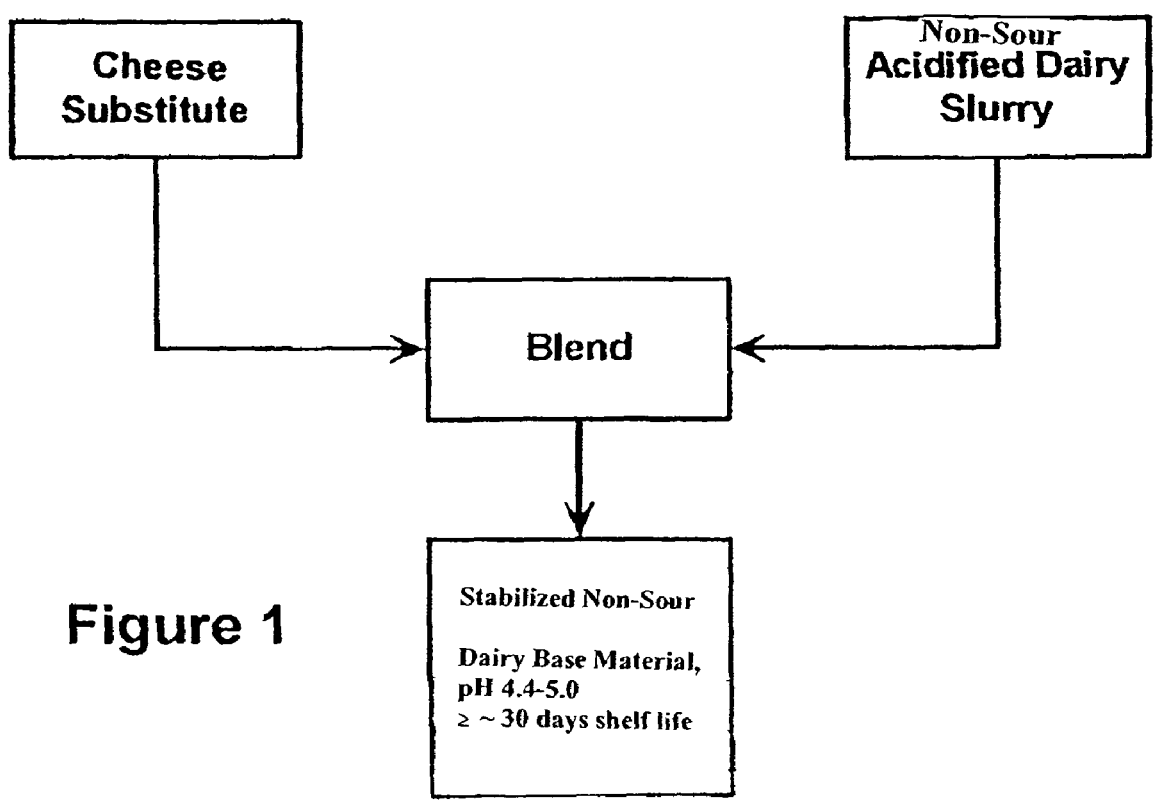
FIG. 1 is a flow diagram showing a general method of producing a stabilized non-sour dairy base material.

Stabilized Non-Sour Dairy Base Material. Referring to FIG. 1, in one embodiment of the present invention a stabilized non-sour dairy base material having acidic pH and an extended refrigerated shelf life is provided as a combination of a non-sour acidified dairy slurry and cheese component. The finished dairy base material generally is prepared as a stable emulsion of these components without fat separation or syneresis problems. In particular, a stabilized dairy base material having a pH of about 4.4 to about 5.0, particularly about 4.7 to about 5.0, more particularly about 4.8 to about 5.0, and which is shelf-stable for at least about 30 days, particularly at least about 90 days, and more particularly at least about 120 days, under refrigerated storage conditions, is generally prepared by combining a non-sour acidified dairy slurry comprising a non-sour acidulant and a cheese component with a cheese ingredient (e.g., cheese substitute). The extended shelf-lives are provided in these products without the need to include any secondary shelf-life preservative additives, such as nisin or other antimicrobials. Conventional heavy cream generally is shelf-stable for only about 10 days or less under refrigerated storage conditions. Additional exemplary details on the formulations of the dairy base material components and processing techniques applied thereto are described below. Flavors other than natural dairy cream flavor may also be added to the finished dairy base material and/or incorporated during its preparation or constituents thereof, such as during dairy slurry preparation. These flavors include, but are not limited to, fruit, vegetable, chocolate, vanilla, nut, coffee, tea, savory (containing herbs and/or spices) and confection (e.g., chocolate, cocoa, coconut, caramel, and the like).

Non-Sour Acidified Dairy Slurry. The acidified dairy slurry of the dairy base material is generally prepared by combining a blend of dairy ingredient(s) with a non-sour acidulant to provide a stable acidified slurry. If a cheese component is not included in the formulation of the non-sour dairy base material, the acidified dairy slurry is formed as a stable emulsion, such as by using methods for that purpose as described herein.

Dairy Blend for Dairy Slurry Preparation. The dairy blend used for preparing the acidified dairy slurry generally comprises a mixture of dairy cream, a fat source, a protein source, water, and optionally gum. As the dairy cream ingredient of the dairy blend, preferably a sweet cream ("heavy cream") is used, but other types of cream (e.g., light cream, plastic cream, anhydrous milkfat, powdered cream) may be used. For example, cream containing about 25 to about 80 percent fat may be used. More preferably, a heavy cream comprising about 55 to about 60 percent fat, about 1 to about 2 percent protein, and about 3 to about 4.5 percent lactose is used. As the fat source, an edible vegetable oil and/or dairy fat may be used. Suitable vegetable oils in this respect include, for example, palm oil, palm kernel oil, canola oil, hydrogenated soybean oil, and the like, as well as mixtures thereof. Dairy fats include, for example, concentrated milk fat or anhydrous milkfat ("butter fat"). Suitable dairy fats generally contain at least about 50 percent, and particularly at least about 70 percent, fat content. The protein source may be a dairy protein and/or vegetable protein. Suitable dairy protein sources can be derived, for example, from non-fat dry milk (NFDM), milk protein concentrate, whey protein concentrate, casein, and the like. Suitable dairy proteins generally contain at least about 15 percent, and particularly at least about 35 percent, protein content on dry weight basis. The protein source also may be a vegetable protein, such as soy protein. Soy protein can be derived from soy materials, such as soy milk, soy protein concentrate, soy protein isolate, soy concentrate, and/or (defatted) soy flour, etc. Suitable soy proteins generally contain at least about 25 percent, and particularly at least about 50 percent, protein content on dry weight basis. If used, suitable stabilizer gums include, for example, carob bean gum, guar gum, xanthan gum, Tara gum, and the like as well as combinations thereof.

Non-Sour Acidulant(s) for Dairy Slurry Preparation: Metal Acid Salts. In one embodiment, the non-sour acidulant used in preparing the acidified dairy slurry is a metal acid salt of an inorganic acid. Metal acid salts of inorganic acids that may be used in this invention include, but are not limited to, edible alkali or alkaline earth metal acid salts, such as sodium, potassium, calcium or magnesium bisulfate salts. These metal acid salts include, e.g., sodium bisulfate (i.e., sodium hydrogen sulfate or sodium acid sulfate), potassium bisulfate (i.e., potassium hydrogen sulfate), calcium bisulfate (i.e., calcium hydrogen sulfate, acidified calcium sulfate), magnesium bisulfate (i.e., magnesium hydrogen sulfate or magnesium acid sulfate), and mixtures thereof. These metal acid salts are commercially available in dry granular crystalline form in particle sizes that can be readily and uniformly dispersed and solubilized in aqueous based dairy blends. Food grade sodium acid sulfate may be commercially obtained in dry granular form, e.g., as PHase™ (Jones-Hamilton Co., Walbridge Ohio). Food grade calcium acid sulfate may be commercially obtained in dry granular form, e.g., as Safe$_2$O™ (Mionix, Rocklin, Calif.). While the metal acid salts represent one category of non-sour acidulant used in preparing the stabilized dairy base material, other types of non-sour acidulants also may be used. These include, for example, non-sour, food grade mineral acids and acidic ED compositions, which are discussed further below.

Edible Non-Sour Mineral Acid Acidulants. Edible non-sour mineral acids which may be used as the non-sour acidulant include, e.g., inorganic acids such as food grade hydrochloric acid, sulfuric acid, and mixtures thereof. These mineral acids may be used in food grade form in a wide range of concentrations. For example, approximately 5.5-7 N HCl may be used as a direct acidulant additive. In principle, phosphoric acid (with a low pKa1 of 2.1) can also be classified as a non-sour inorganic acid or acidulant under the present invention. Phosphoric acid is less preferred for the preparation of acidified dairy component based on sensory taste preference.

Figure 4:
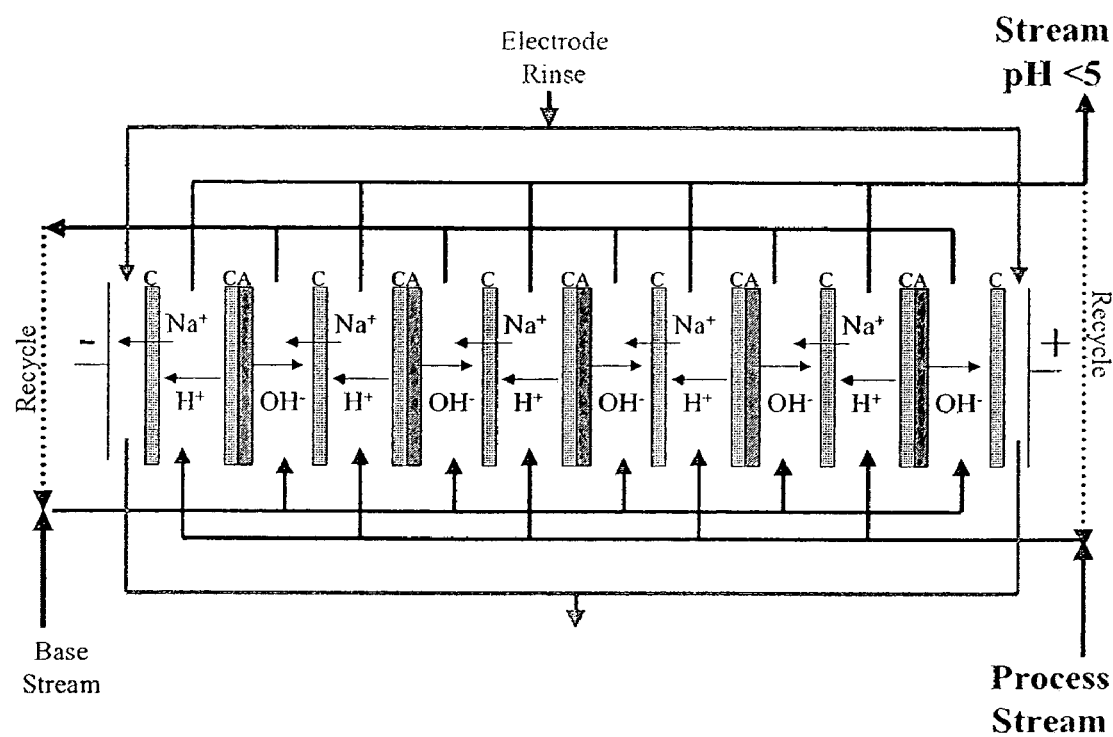
FIG. 4 is an example of a membrane electrodialysis system for decreasing pH in preparing ED composition (e.g. water) as a non-sour acidulant which can be used in preparing the stabilized non-sour dairy base material in accordance with an embodiment of the present invention.
Figure 5:
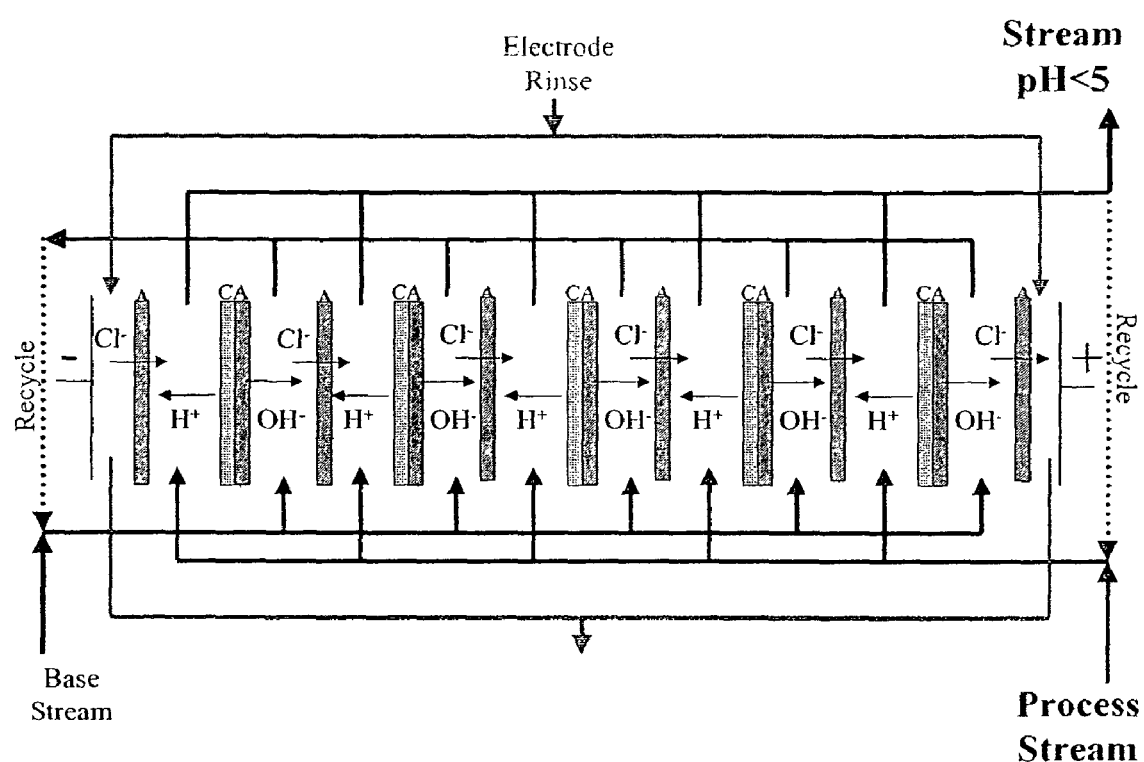
FIG. 5 is another example of a membrane electrodialysis system for decreasing pH in preparing ED composition (e.g. water) as a non-sour acidulant which can be used in preparing the stabilized non-sour dairy base material in accordance with an embodiment of the present invention.

Acidic Electrodialyzed (ED) Compositions Acidulants and Their Preparation. Acidic ED compositions also may be used as the non-sour acidulant. As described below, an aqueous solution is used as a feed stream and is processed using membrane electrodialysis to form an acidic ED composition. Acidic ED compositions, like the contemplated inorganic acids and salts thereof, used herein are suitable for human consumption. FIGS. 4-5 illustrate two different non-limiting examples of electrodialysis systems that may be used to form the ED compositions. Unless indicated otherwise, acidic ED processing descriptions and materials therefore as described below should be considered applicable to any of the systems of FIGS. 4-5.

Aqueous feed solutions which may be treated with an ED method to produce acidic ED composition include any mineral or ion rich aqueous solution obtainable from natural water sources such as spring water, well water, municipal water, sea water and/or artificially ion enriched water free from contamination and excessive chlorination (for example greater than about 2 ppm of free chlorine). An aqueous feed solution for ED treatment should have a total cation or total anion concentration of about 0.0001N to about 1.8N which is effective for providing an initial conductivity of about 0.005 to about 200 mS/cm. As used herein, "total cation concentration" or "individual cation concentration" means any cation (such as $Na^+$, $K^+$, $Ca^{++}$, $Mg^{++}$) concentration excluding hydrogen ion concentration. "Total anion concentration" or "individual anion concentration" means any anion (such as $Cl^-$, $F^-$, $SO_4^{-2}$, $PO_4^{-3}$) concentration excluding hydroxyl ion concentration. Ion concentrations may be determined using techniques known in the art, such as for example, inductive coupled plasma atomic emission spectroscopy for selected cations and ion chromatography for selected anions.

In an important aspect, the aqueous feed solution to be treated with ED may have a total cation or total anion concentration of about 0.0001N to about 1.0N which is effective for providing an initial conductivity of about 0.01 to about 30 mS/cm. For example, the aqueous solution to be treated with ED may include at least one of the following:

| | Concentration (N) |
|---|---|
| Cations: | |
| calcium | 0-0.2 |
| magnesium | 0-0.002 |
| potassium | 0-0.01 |
| sodium | 0-1.7 |
| Anions: | |
| bicarbonate | 0-0.07 |
| chloride | 0-1.7 |
| sulfate | 0-0.01 |

All ion concentrations can not be zero as the total ion concentration must be about 0.0001N to about 1.0N. Other non-toxic, edible ions may also be included.

As shown in FIGS. 4-5, membrane electrodialysis may be conducted using various configurations of a bipolar membrane and anionic and cationic membranes. The membranes are disposed between a cathode and anode and subjected to an electrical field. The membranes form separate compartments and materials flowing through those compartments may be collected separately. An example of an electrodialysis apparatus containing ion-selective membranes is EUR6 (available from Eurodia Industrie, Wissous, France). Suitable membranes are available, for example, from Tokuyama (Japan). A bipolar membrane includes a cationic membrane and an anionic membrane joined together.

In accordance with one aspect, an aqueous solution is contacted with the ion-selective membranes. Aqueous solutions may be processed in a batch mode, semi-continuous mode, or continuous mode by flowing an aqueous solution over the ion-selective membranes. An electrical potential is applied across the anode and cathode for a time effective for providing an electrodialyzed solution with the desired pH and ion concentrations. Processing times in batch mode and flow rates in semi-continuous mode or continuous mode are a function of the number of ion-selective membranes that are used and the amount of electrical potential applied. Hence, resulting ED solutions can be monitored and further processed until a desired pH and ion concentration is achieved. Generally, an electrical potential of about 0.1 to about 10 volts is provided across the anode and cathode electrode in each cell.

As shown in the embodiments of FIGS. 4-5, the pH of the aqueous solution may be adjusted to a pH range of about 0 to about 7 by contacting the aqueous solution with at least one, preferably a plurality of bipolar membranes that includes cationic membranes on both sides of the bipolar membrane (FIGS. 4-5). Materials from the compartments to the left of the bipolar membranes are collected for subsequent use. Materials collected from the compartments to the right of the bipolar membranes may be recirculated back through the membranes or circulated to a second membrane electrodialysis as many times as needed to provide an aqueous solution having a pH of about 0 to about 7, preferably, about 1 to about 5. Materials from the compartments to the left of the bipolar membranes may also be recirculated back through the membranes. Materials from the compartments adjacent to the anode and cathode may be recirculated back through the membranes.

After treatment with membrane electrodialysis, such as according to any one of the systems of FIGS. 4-5, the pH altered ED composition has a total cation or anion concentration of less than about 1.0N, a concentration of any individual ion of less than about 0.6N and a free chlorine content of less than 2 ppm. In a preferred embodiment, the acidic ED composition has a total cation concentration or anion concentration of less than about 0.5N, individual cation or anion concentration of less than 0.3N, and a free chlorine content of less than 1 ppm. For example, the electrodialyzed composition may contain at least one of the following:

| | Concentration (N) |
|---|---|
| Cations: | |
| calcium | 0-0.1 |
| magnesium | 0-0.001 |
| potassium | 0-0.005 |
| sodium | 0-0.9 |
| Anions: | |
| bicarbonate | 0-0.04 |
| chloride | 0-0.9 |
| sulfate | 0-0.005 |

Other non-toxic, edible ions may also present limited mainly by the taste impact of the individual ions. After treatment with membrane electrodialysis, acidic ED compositions will have a pH ranging from about 1 to about 5. Treated solutions have a free chlorine content of less than 1 ppm and do not have objectionable tastes and/or odors.

Depending on the type of non-sour acidulant used in preparing the acidified dairy slurry, it may be incorporated into the slurry from a dry state, liquid state, or aqueous dispersed state. If liquid forms of non-sour acidulants are available or provided, such as the acidic ED compositions, they may be used in the dairy base material as at least a partial source for the water normally present in the formulation. Generally, the non-sour acidulant has a pH of about 1.0 to about 3.5 in liquid form, or equivalent acidifying power if added in dry granular form. Shelf stable dairy base materials may be prepared by incorporating an amount of non-sour acidulant into the acidified dairy slurry, and hence the finished dairy base material, effective for obtaining an acidified dairy base material having a final product pH of 4.4 to 5.0, and particularly 4.7 to 5.0. A small amount of conventional organic food acidulant(s), such as lactic acid, vinegar, may be present in the dairy base material, or food products incorporating it, for slight flavor and/or taste refinement purposes, but not in an amount creating objectionable sour taste or acidic bite.

Dairy Slurry Preparation. Generally, the acidified dairy slurry is formulated to contain about 55 to about 60 percent moisture, about 32 to about 40 percent fat, and has a pH of about 4.4 to about 5.0, particularly about 4.7 to about 5.0, and more particularly about 4.8 to about 5.0. Moisture content of the acidified dairy slurry generally will be introduced via one or more of the dairy blend, non-sour acidulant (if in liquid form), and/or directly during processing including any condensate. Small amounts of water also may be introduced via optional processing aids, flavorants, preservatives, etc.

In preparing the acidified dairy slurry, the dairy blend constituents and the non-sour acidulant generally are combined in respective amounts providing about 65 to about 80 percent dairy cream (38% to 46% fat), about 5 to about 8 percent vegetable and/or dairy fat source, about 3 to about 5 percent soy and/or dairy protein source, about 0.1 to about 1 percent edible non-sour acidulant, 0 to about 0.4 percent gum, and total water content of about 54 to about 59 percent. However, different proportions of the components may also be used to form an acidified dairy slurry with slightly different characteristics if desirable. For instance, the water content of the acidified dairy slurry can be varied as needed to obtain a desired viscosity of the resulting acidified dairy slurry. Also, as indicated, the amount of non-sour acidulant added during preparation of the acidified dairy slurry should be sufficient to allow acidification of the dairy base material when incorporating the slurry to a pH range of about 4.4 to about 5.0. The amount of non-sour acidulant needed to meet this criterion can vary depending on the type and form of the acidulant being used, and also the overall dairy blend that is being acidified with it.

The presence of gum in the acidified dairy slurry formulation, if used, acts as a stabilizer which aids in preventing occurrence of water syneresis, i.e., the separation of water and/or fat, in the acidified dairy slurry. If stabilizer is not included in the acidified dairy slurry, the acidified dairy slurry preferably is homogenized, or subjected to other process treatment having similar particle/droplet size reduction and emulsification effects (e.g., high shear rotor/stator mixing), before subsequent combination with the cheese component, in order to stabilize the acidified dairy slurry against water and/or fat separation.

Figure 2:
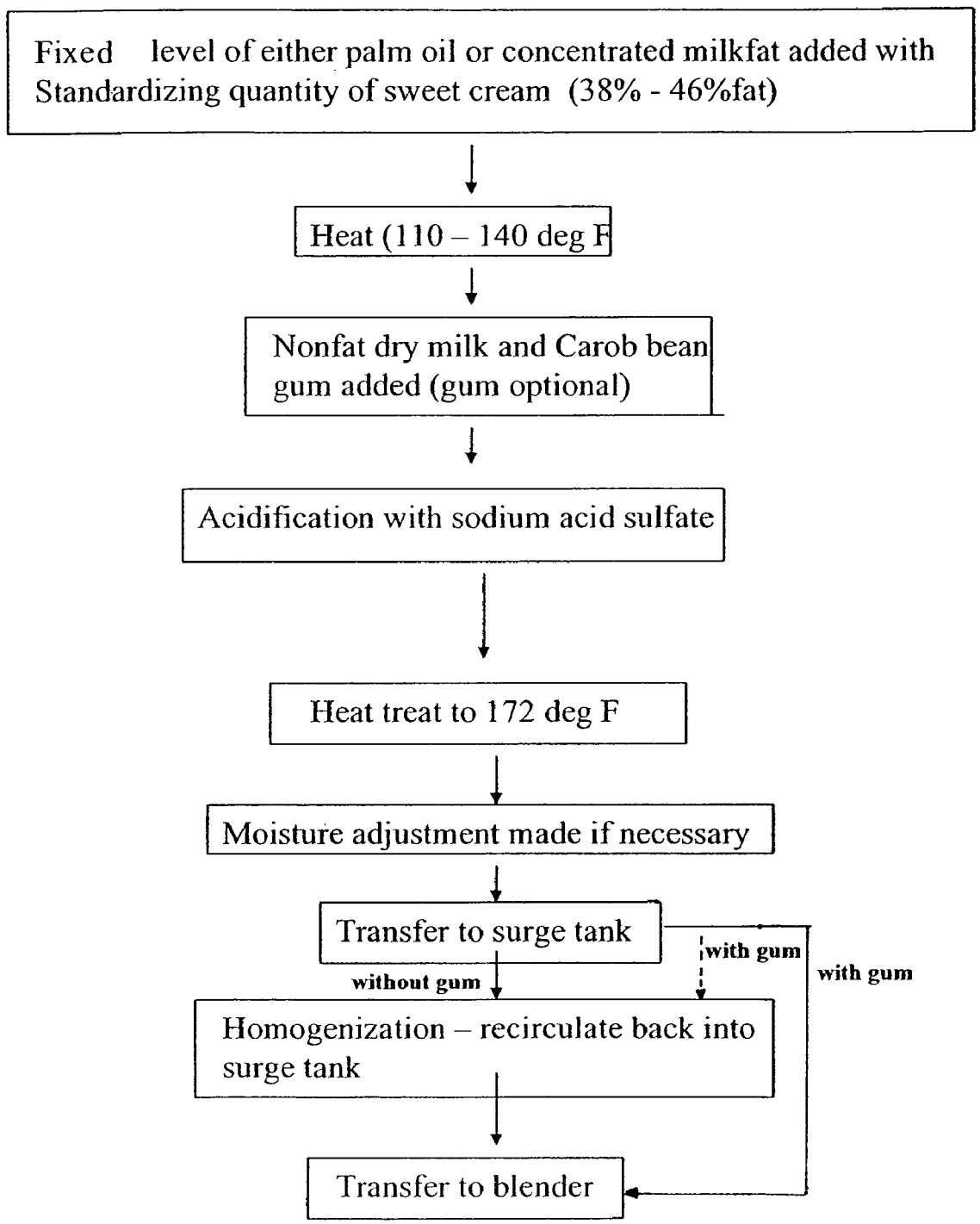
FIG. 2 is a flow chart showing a method for producing an acidified dairy slurry component of the stabilized non-sour dairy base material.

Referring to FIG. 2, an exemplary non-limiting process flow for preparing acidified dairy slurry is illustrated. As indicated, a dairy cream and a vegetable or dairy fat source are initially blended and cooked. The cooking step helps to blend the various ingredients and/or it may also serve as a pasteurization step, depending on the heating temperature and time profile. Then, a dairy or soy protein source, and, optionally, gum, are added, followed by addition of the non-sour acidulant with thorough mixing. The sequence of ingredient addition can be varied. The resulting mixture is cooked, e.g., by heating it to a temperature of about 165 to about 190° F. in a time span of about 8 to about 12 minutes in a cooker, such as a Breddo cooker or other appropriate container. This cooking step helps to activate any added gum and to blend the various ingredients; it may also serve as a pasteurization step. Moisture adjustments may be made if necessary in the cooked mixture. As indicated in FIG. 2, if the dairy slurry is formulated without gum, the cooked mixture generally needs to be homogenized before further processing to mitigate occurrence of water and/or fat separation in the dairy slurry, which otherwise may carryover into the finished dairy base material product and reduce ultimate product quality. If gum is included in an amount effective stabilizing amount in the dairy slurry formulation, the dairy slurry generally does require homogenization to control water and/or fat separation problems prior to further processing to complete preparation of the dairy base material. However, homogenization treatment optionally may be applied to a dairy slurry formulation containing gum.

Figure 3:
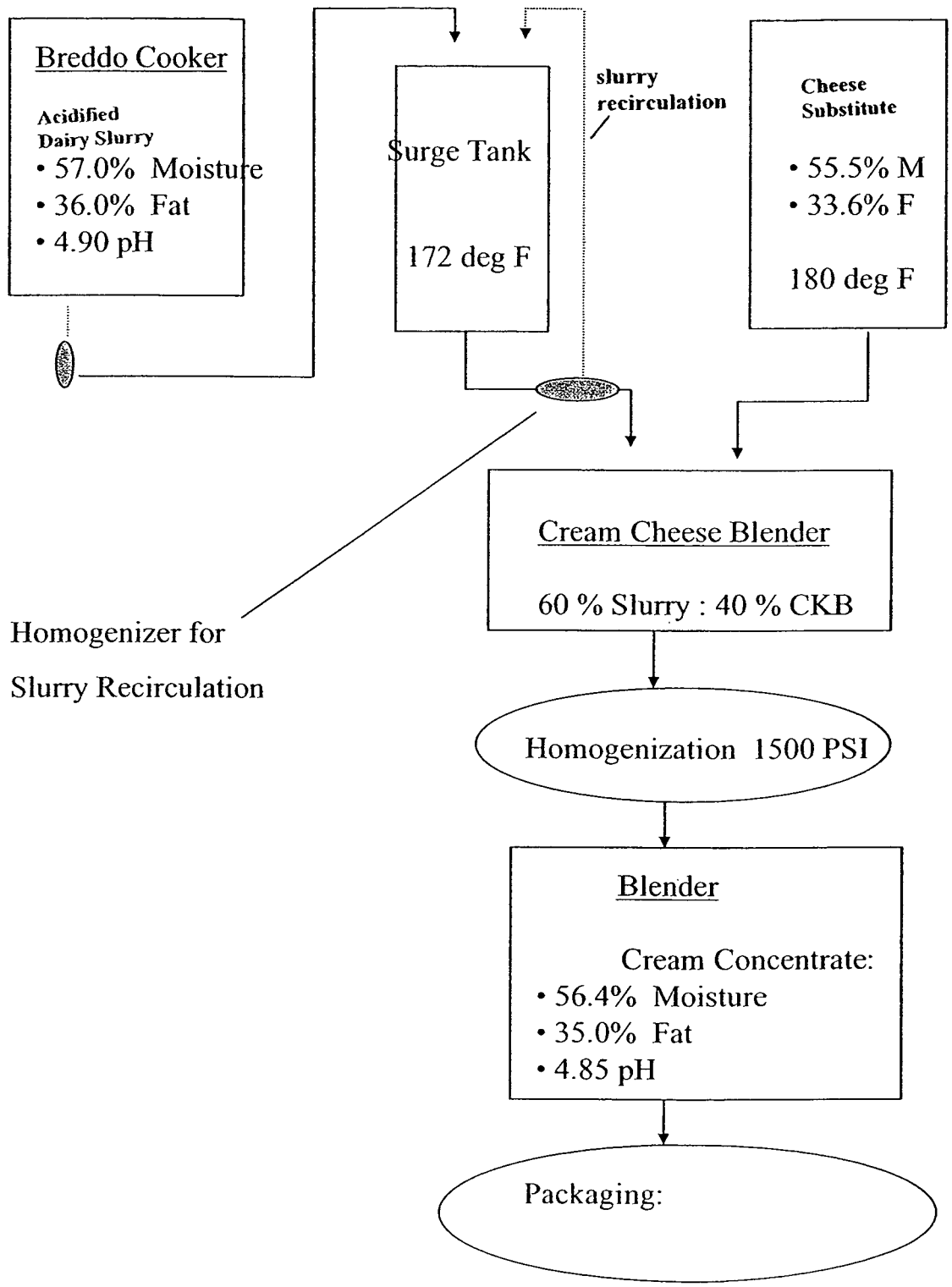
FIG. 3 is a flow diagram showing a particular method of producing a stabilized non-sour dairy base material useful as a heavy cream substitute in accordance with an embodiment of the present invention.

As indicated in FIG. 3, a surge tank is provided in this embodiment to accumulate and temporarily hold acidified dairy slurry before further processing. The process system is adapted such that at least a portion of the dairy slurry exiting the surge tank may be recirculated through a homogenizer unit or other comparable food shear-mixing unit and back into the surge tank before it is advanced to blending equipment in which the non-sour dairy base material product will be prepared. The homogenizer unit indicated in FIG. 3 may include a diverter valve subsystem and controls such that the homogenizer unit can be selectively activated to homogenize or not homogenize a passing slurry stream, and valving and valving controls are included permitting control over the slurry recirculation rate back to the surge tank or directly to the blender. If applied, homogenization of the dairy slurry is generally carried out at a pressure of about 750 to about 4,500 psi and, more particularly, at about 500 to about 1000 psi if recirculated, and from about 2500 to about 4500 psi if not recirculated. The recycle rate and pressure at which the homogenization of the dairy slurry occurs generally is selected to be sufficient to stabilize a given dairy slurry formulation against water separation. If gum is added, the cooked mixture can be fed directly from the surge tank or other temporary process storage means before being combined with cheese substitute for preparation of the dairy base material. As with the dairy slurry receiving homogenization, if gum is introduced via the dairy slurry, then post-homogenization of the dairy slurry/cheese substitute blend before packaging, such as indicated in FIG. 3, also generally is still necessary to provide finished product with a stable emulsion throughout shelf life.

Stabilized Non-Sour Dairy Base Material Preparation. As illustrated in FIG. 3 showing an exemplary non-limiting process flow, fresh dairy slurry can be combined with cheese substitute with blending and homogenization to prepare a stabilized dairy base material. If the dairy slurry is not immediately used in dairy base material production, it can and should be refrigerated until later used. The dairy base material generally combines the acidified dairy slurry component with a cheese substitute component in a weight ratio of about 52:48 to about 68:32, respectively, and particularly about 55:45 to about 65:35, respectively. The stabilized dairy base material product generally comprises about 30 to about 75 percent moisture, about 11 to about 65 percent fat, about 3 to about 5 percent protein, and optionally about 4 to about 5 percent lactose. In a particular embodiment, it may contain about 35 to about 75 percent moisture, about 20 to about 65 percent fat, about 3 to about 5 percent protein, and optionally about 4 to about 5 percent lactose. In a more particular embodiment, it may contain about 55 to about 60 percent moisture, about 32 to about 40 percent fat, about 3 to about 5 percent protein, and optionally about 4 to about 5 percent lactose. As indicated, the dairy base material is formulated to have a final pH of about 4.4 to about 5.0, and particularly about 4.7 to about 5.0, and more particularly about 4.8 to about 5.0.

The acidified dairy slurry and cheese substitute components of the dairy base material may be combined and mixed using conventional cream/cheese processing techniques and equipment. However, differing amounts of the components may also be used to form stabilized dairy base materials with slightly different characteristics as desired. The resulting mixture is then homogenized to form the stabilized dairy base material. The homogenization is generally carried out at a pressure of about 500 to about 2,500 psi and, more particularly, at about 1,300 to about 1,800 psi. The pressure at which the homogenization occurs may be selected according to the desired firmness of the stabilized dairy base material, with a lower pressures providing lower firmness and higher homogenization pressures providing higher firmness. The dairy base material product may be packaged so that it may be more conveniently handled and further protected from contaminants during refrigerated storage. The dairy base material preferably is stored and handled under refrigerated conditions. Alternatively, the dairy base material could be used immediately upon preparation in further food production as part of a continuous integrated food production line, which would eliminate packaging and refrigerated product storage needs.

Cheese Component. The cheese component may include any cheese-like material (e.g. cheese analog, cheese substitute, process cheese) and/or natural cheese. For cost considerations a cheese substitute or cheese analog may be preferred. The preferred cheese component that is combined with the acidified dairy slurry to provide the dairy base material is a cream cheese substitute or cheese analog. The cream cheese substitutes for use in the preparation of the dairy base material generally contain about 11 to about 40 percent fat and about 50 to about 75 percent moisture, and particularly about 25 to about 40 percent fat and about 50 to about 60 percent moisture. In one non-limiting embodiment cream cheese substitutes for use in this invention contain about 33 to about 36 percent fat and about 52 to about 55 percent moisture (i.e., similar levels as for natural cream cheese) but less than about 10 percent milkfat. According to this invention, a cream cheese substitute is a product which resembles real cream cheese, but contains at least 20 percent vegetable oil (e.g., palm oil) and less than 10 percent milk fat. Cheese analogs having similar properties and characteristics are also suitable. One especially preferred cream cheese substitute is Kraft Cheezkake Blend™ from Kraft Food Ingredients (Memphis, Tenn.). Other suitable cheese components are cream cheese or Neufchatel cheese. The cream cheese substitutes and cheese analogs used in the present invention can be prepared, for example, using standard cream cheese production techniques. They particularly may contain milk, vegetable oil, cheese culture, salt, carob bean gum, mono- and diglycerides, and color. They also may include minerals, vitamins, antioxidants, herbs, spices, fruits, vegetables, nuts and/or other food flavorants and additives. Suitable vegetable oils include, for example, palm oil, canola oil, hydrogenated soybean oil, and the like, as well as mixtures thereof. In one embodiment, the cream cheese substitute contains about 32-36 percent fat, about 52-56 percent moisture, i.e., similar levels as in conventional cream cheese, and about 20-26 percent vegetable oil, and less than about 11 percent milkfat.

Stabilized Non-Sour Dairy Base Material Without Cheese Composition. In another particular embodiment, an alternate form of the stabilized non-sour dairy base material is provided without the cheese component. The material can be used directly as a non-sour type product in finished foods. In this embodiment, a stabilized non-sour type product is provided directly from acidified dairy slurry which comprises a fat source (e.g., a dairy fat source), a dairy or soy protein source, a non-sour acidulant, and water, with a pH between about 4.4 and about 5.0 and a shelf-life of at least about 30 days under refrigerated conditions, particularly at least about 120 days. In one particular embodiment, the finished stabilized non-sour cream type product (without cheese composition) has a total fat content of about 25 to 65 percent, a total moisture content of about 35 to 75 percent, and a solid non-fat content of about 4 to about 6 percent. As indicated, if a cheese component is not included in the formulation of the non-sour dairy base material, the acidified dairy slurry is formed as a stable emulsion, such as by using methods for that purpose as described herein.

The stabilized dairy base material typically is stored under refrigerated temperature conditions until later used in food preparation. To provide further enhanced microbiological stability, the stabilized dairy base material may optionally be aseptically packaged and/or thermally treated, e.g., pasteurized. Pasteurization may occur during cooking procedures used in preparing the dairy base material. Alternatively, the dairy base material may be hot filled in a heat-stable, sealable container, or retorted, and then cooled to refrigeration storage conditions. The dairy base material has no objectionable sour taste or off-flavors commonly associated with the use of organic acid type food acidulants and is stable under refrigerated conditions for extended periods of time as compared to conventional heavy cream.

Food Products. Food products which may be prepared with the above described stabilized non-sour dairy base materials include, for example, sauces, gravies, spreads, dips, dressings, fillings, toppings, desserts, and the like as well as combinations thereof. The non-sour dairy base materials including low cost cheese component or substitute are particularly useful as a reduced cost replacement for conventional heavy cream and half and half dairy products. The non-sour stabilized dairy base material is particularly well-suited for preparing savory sauces (e.g., Alfredo) and desserts (e.g., Tiramisu) and can be used in a similar manner as conventional heavy cream in such food applications. The stabilized non-sour dairy base material provides added convenience, stability and cost advantages in the preparation of cream-based sauces and desserts, when used as a replacement for at least part of the conventional heavy cream requirements of the sauce or dessert recipes. In one embodiment, the food product is a dairy-based food product containing about 20 to about 80 weight percent of the stabilized non-sour dairy base material.

Total Organic Acid Content Limits. Total organic acid content in a food product can influence the perceived sourness intensity. The "organic acids" in a preserved food mainly come from one or more added edible food acidulants including, but not limited to, e.g., acetic acid, adipic acid, citric acid, fumaric acid, gluconic acid, lactic acid, malic acid, phosphoric acid, and tartaric acid. Natural occurring organic acids in food ingredients will also contribute to perceived sourness. Thus "total organic acid content" is defined hereafter as the sum of all the above-mentioned food acidulants and all natural occurring organic acids (including those not mentioned above such as oxalic acid, succinic acid, ascorbic acid, chlorogenic acid and the like). An organic acid profile can be readily obtained using appropriate analytical method such as S. Rantakokko, S. Mustonen, M. Yritys, and T. Vartiainen. Ion Chromatographic Method for the Determination of Selected Inorganic Anions and Organic Acids from Raw and Drinking Waters Using Suppressor Current Switching to Reduce The Background Noise from Journal of Liquid Chromatography and Related Technology (2004); 27, 821-842. The quantity of individual organic acids can be measured and summed up to give "total organic acid content" which is conveniently expressed in "moles per 1000 grams of finished food product".

The use of one or more of the above-indicated non-sour food acidulants may not always eliminate or significantly reduce perceived sourness in the resulting low pH foods and provide an acceptable product, depending on the possible co-presence and concentrations of sourness-imparting components in the same food compositions. In particular, maintaining a low level of total organic acid, especially α-hydroxy organic acids, in a given food product (as consumed) may be important in providing an acceptable acidified food product. Effective ingredient selection and formulation to lower organic acid content is needed for some formulated food products to provide shelf-stable food composition which do not have a sour taste normally associated with low pH foods. In one embodiment, the food product incorporating the stabilized dairy base material described herein has a total organic acid content of less than about 0.22 moles per 1000 grams of food composition, particularly a total organic acid content of less than about 0.12 moles per 1000 grams food composition, and more particularly a total organic acid content of less than about 0.06 moles per 1000 grams food product. The organic acids to be kept within these range amounts include, e.g., acetic acid, citric acid, lactic acid, malic acid, tartaric acid, fumaric acid, gluconic acid, adipic acid, and/or lactobionic acid. For prepared foods this may be obtained by appropriate ingredient selection and/or modification. In one embodiment, the finished food product or composition is free or essentially free of organic acids which impart sourness. However, it will be appreciated that a small flavor-modifying amount of a sour organic acid within the above range amounts may be included in a pH-modified food product to adjust or alter the flavor profile in a desirable manner other than imparting undesirable acidic bite. For purposes of this invention, "essentially free of organic acids" means a total organic content of less than about 0.12 moles per 1000 grams.

Unless otherwise noted, all percentages given herein are weight percentages. The following examples are provided to illustrate the invention and not limit it.

EXAMPLES

Example 1

Dairy Base Materials with Sodium Acid Sulfate

This example illustrates the preparation and evaluation of dairy base materials of differing formulations and process conditions. Dairy base material samples, designated Samples 1 and 2, were formulated as 60:40 weight ratio blends of an acidified dairy slurry and a cheese substitute. The acidified dairy slurries were formulated with dairy cream, vegetable or dairy fat source, dairy protein source, non-sour acidulant, and optionally gum. The selected sample variables applied are described in Table 1 below.

For dairy base material Samples 1 and 2, two respective batches of acidified dairy slurries were formulated with a fixed level of sweet cream (38% fat, 43.5 TS), non-fat dry milk (NFDM), and one of several different fats (i.e., concentrated milkfat (CMF) or palm oil) to achieve a final fat content of 36 percent. In preparing Sample 1, a first homogenization treatment (2-stage, 3500/500 psi) was applied in-line to the acidified dairy slurry after its preparation and after it was transferred to the surge tank, as shown in the process flow shown in FIGS. 2-3, and prior to blending the slurry with the cheese substitute. In preparing Sample 2, the acidified dairy slurry did not receive a first homogenization treatment prior to blending the slurry with the cheese substitute. The slurry/cheese substitute blends of both Samples and 1 and 2 were subjected to homogenization treatment of 1500 psi (1000/500 psi) after final blending and immediately prior to packaging. For Sample 2, an acidified dairy slurry was prepared with CMF, carob bean gum addition, and no (first) homogenization treatment was performed on the slurry. As with Sample 1, the combined slurry/cheese substitute prepared for Sample 2 was homogenized at 1500 psi after blending and prior to packaging. The acidulant used was food grade sodium acid sulfate, i.e., sodium bisulfate, which was commercially obtained in dry granular form (PHase™, Jones-Hamilton Co., Walbridge Ohio). The cheese substitute used was commercial cream cheese substitute: Kraft Cheezkake Blend™ from Kraft Food Ingredients (Memphis, Tenn.).

As indicated, for Samples 1 and 2, the acidified slurry prepared for each sample was prepared according to the process flow and conditions generally shown in FIGS. 2-3 with the above-noted modifications that the acidified dairy slurry component of sample 1 received a first homogenization treatment after it was transferred to the surge tank and before being blended with the cheese substitute, while the acidified dairy slurry component of Sample 2 received no such first homogenization treatment.

Also, the dairy base material for each sample was prepared by blending respective dairy slurries and the cheese substitute according to the process flow and conditions generally shown in FIG. 3 in which the sample runs received the post-blend homogenization treatment, as previously indicated. Samples 1 and 2 were formulated to have approximately 57 percent total moisture, approximately 36 percent total fat, and pH of 4.7-4.99.

TABLE 1

Dairy Slurry Formulations

| Ingredient, wt % | Sample 1 | Sample 2 |
|---|---|---|
| sweet cream | 78.51 | 78.51 |
| CMF | 0 | 7.50 |
| AMF | 0 | 0 |
| Palm oil | 6.00 | 0 |
| NFDM | 2.89 | 2.89 |
| Sodium acid sulfate | 0.40 | 0.40 |
| Gum | 0 | 0.15 |
| Moisture, total | 57 | 57 |
| Fat, Total | 36 | 36 |
| Homogenization of slurry | 3500/500 psi | none |

Example 2

Evaluations of Dairy Base Materials Made with Sodium Acid Sulfate

After approximately 14 days refrigerated storage (at approx. 37° F.), textural observations of the dairy base material Samples 1 and 2 made according to Example 1 were made, and measurements were taken of pH and texture (firmness). Viscosity for each sample in Alfredo sauce application as well as the viscosity of a natural heavy cream sample in the same application were also measured. Firmness was measured using 2×2×2 inch samples with a TA-XT2 Texture Analyzer with a Ta-4 probe (Texture Technologies Corp., Scarsdale, N.Y.). The results are reported in Table 2 below. Samples were cooled to about 37° F. before testing. Alfredo sauce viscosity was measured using a Haake viscometer model RT-30 with a RT-10 measuring cup and a Rotor Z20 probe with a 4.20-mm gap at 15.5° C.

TABLE 2

Dairy Base Material Sample Observations and Properties

| Sample | Observation | pH | Texture (Firmness), g | Viscosity (cp) |
|---|---|---|---|---|
| 1 | Creamy texture, no water syneresis | 4.97 | 586 | 168 |
| 2 | Creamy texture, no water syneresis | 4.87 | 767 | 168 |
| Heavy Cream | Sweet creamy flavor, liquid form | 6.78 | NA, liquid form- | 165 |

Samples 1 and 2 had pH in the target range and suitable firmness and viscosity for cream substitute applications.

Example 3

Evaluations of Dairy Base Materials Made with Sodium Acid Sulfate in Sauces Alfredo sauces were prepared individually with each of dairy base material Samples 1 and 2 made in accordance with Example 1 to evaluate their suitability as replacements for heavy cream in sauce preparations. Sauces 1 and 2, which were prepared with the control dairy material and Samples 1 and 2, respectively, had the formulations indicated in Table 3 below. A control sauce C used natural heavy cream as the dairy material. Sauces were prepared by hydrating flour with required amount of cold water, and then combining all ingredients in a saucepan using a double boiler, over medium heat, stirring constantly until smooth and hot (approx. 180-185° F.).

TABLE 3

Dairy Base Material Samples evaluated in Alfredo Sauce

| Ingredient | Sauce C cream Control % | Sauce 1 cream subst. 1 % | Sauce 2 cream subst. 2 % |
|---|---|---|---|
| Full Moisture Parmesan Cheese | 19.36 | 19.28 | 19.28 |
| Heavy Cream | 74.12 | 0.00 | 0.00 |
| Dairy Base Material | 0.00 | 30.84 | 28.09 |
| Water | 0.00 | 43.21 | 45.96 |
| Butter | 3.11 | 3.11 | 3.11 |
| Flour | 2.16 | 2.16 | 2.16 |
| Fresh Minced Garlic | 0.87 | 0.87 | 0.87 |
| Salt | 0.35 | 0.35 | 0.35 |
| Black Pepper | 0.03 | 0.03 | 0.03 |
| Nutmeg | 0.001 | 0.001 | 0.001 |
| Cream flavor I2244 | 0.00 | 0.15 | 0.15 |
| Total | 100.00 | 100.00 | 100.00 |

Sensory analyses for flavor profile were conducted on the Alfredo sauces containing various Samples 1 and 2, and the results are shown in Table 4 below. Eight experienced sensory evaluators, as panelists, evaluated each of the sauces.

TABLE 4

Sauce Flavor profiles

| Sample used | Sauce Flavor profile |
|---|---|
| Heavy Cream | Cheesy, creamy, buttery, good mouthfeel with little acidic bite |
| 1 | Cheesy, slightly acidic, good flavor profile, very close to control |
| 2 | Cheesy, very slightly acidic, good flavor profile, close to control |

Six of the eight sensory evaluators selected Sauce 1 containing dairy base material Sample 1 as the closest sample to the Alfredo sauce containing the heavy cream (control) from a sensory standpoint, while the other two panelists picked Sauce 2 containing dairy base material Sample 2 as being closest to the control. Both Sauces 1 and 2 containing dairy base material Sample 1 or 2 presented good flavor profile with a slight but not objectionable acidic note. Similar viscosity readings were achieved through additional water and measurement using a Haake viscometer.

Example 4

Supplemental Evaluations of Dairy Base Materials Made with Sodium Acid Sulfate in Sauces After approximately 82 days refrigerated storage of Samples 1 and 2 made in accordance with Example 1, additional Alfredo sauces were prepared with Samples 1, 2 and heavy cream, using the same sauce preparation procedure as in Example 3. Sample 1 still had a pH of 4.97, and Sample 2 still had a pH of 4.87 at the time of these later sensory evaluations. The sauce preparations had the formulations indicated in Table 5 below.

TABLE 5

Samples further evaluated in Alfredo Sauce

| Ingredient | Sauce C1 With heavy cream Control % | Sauce 3 With cream substitute 1 % | Sauce 4 With cream substitute 2 % |
|---|---|---|---|
| Full Moisture Parmesan cheese | 6.10 | 6.11 | 6.12 |
| Full Moisture Romano | 2.65 | 2.65 | 2.64 |
| Dairy Base Material | 0 | 34.89 | 31.84 |
| Water | 40.77 | 49.03 | 52.12 |
| Heavy Cream | 44.96 | 0 | 0 |
| Butter, unsalted | 0 | 3.48 | 3.47 |
| Food Starch | 4.26 | 2.47 | 2.46 |
| Garlic | 0.81 | 0.98 | 0.97 |
| Salt | 0.41 | 0.34 | 0.34 |
| Black Pepper | 0.03 | 0.04 | 0.04 |
| Nutmeg | 0.009 | 0.011 | 0.011 |
| Total | 100.00 | 100.00 | 100.00 |

For these evaluations, the sauces were evaluated over boiled macaroni pasta in a weight ratio of 60:40, respectively. Eight panelists evaluated each of the sauces. The majority of the panelists selected Sauce 3 formulated with Sample 1 as the closest sample to the control, while the remainder picked Sauce 4 formulated with Sample 2 as closest to the control. Both sauces containing Sample 1 or 2 presented good flavor profile when compared to the control.

Example 5

Supplemental Sensory Evaluations of Dairy Base Materials Made with Sodium Acid Sulfate as Raw Materials and in Sauces Flavor differences between dairy base material Samples 1 and 2 as a raw ingredient, and in Alfredo sauce, were further investigated via more detailed flavor profile sensory evaluations. Heavy cream was used as a control dairy base material for these sensory evaluations.

Seven evaluators experienced in sensory testing evaluated each raw dairy base material sample, and an Alfredo sauce preparation containing the dairy base material or heavy cream in similar respective sauce recipe as described above for each sample and control in Example 4. Various categories of flavor attributes of each test sample were scored on a graduated scale of 1 to 10, with 1 representing low intensity and 10 representing high intensity. The panelists scores for each attribute were averaged, and the results are set forth in the following Tables 6 and 7.

TABLE 6

Flavor Profile of Raw Dairy Base Material or Control

| Sauce: Sample Used | Milky | Buttery | Valeric | Lactic | sweet | cardboard | bitter | astringent |
|---|---|---|---|---|---|---|---|---|
| Control | 9 | 8 | 3 | 5 | 4 | 1 | 1 | 1 |
| 1 | 4 | 3 | 2 | 3 | 2 | 5 | 3 | 4 |
| 2 | 8 | 7 | 4 | 5 | 3 | 2 | 2 | 2 |

TABLE 7

Flavor Profile of Alfredo Sauce Incl. Raw Dairy Base Material or Control

| Sauce: | Flavor Profile | | | | | | | |
|---|---|---|---|---|---|---|---|---|
| Sample Used | Milky | Buttery | Valeric | lactic | garlic | cardboard | sour | astringent |
| Control | 8 | 7 | 2 | 5 | 7 | 1 | 2 | 2 |
| 1 | 4 | 3 | 3 | 3 | 4 | 5 | 4 | 4 |
| 2 | 9 | 8 | 2 | 4 | 6 | 1 | 3 | 3 |

As conclusions of this sensory evaluation, in both the raw ingredient and Alfredo Sauce, Sample 1 was the least milky and buttery. In both the raw ingredient and Alfredo sauce, Sample 2 was closer to the control than Sample 1, although Sample 1 was sufficiently close to be considered suitable for use as a substitute for the control.

Example 6

Dairy Base Materials with Sodium Acid Sulfate via Modified Process

Additional dairy base material samples were prepared using a modified process as compared to Example 1. Sodium acid sulfate was again used as acidulant. A Sample 1* was formulated with a fixed level of palm oil, no gum addition, and with post homogenization of the dairy slurry/cheese substitute blend in a similar manner to Sample 1 of Example 1 except that the slurry homogenizer was retrofitted to re-circulate the dairy slurry at the surge tank before final blending with cheese substitute, as illustrated in FIGS. 2 and 3. The slurry homogenizer was operated at a pressure of 800 psi. A Sample 2* also was prepared with a fixed level of CMF, carob gum added and without a homogenization treatment of the dairy slurry before blending with the cheese substitute blend, somewhat similar to Sample 2. CMF was very firm-bodied and was transferred to the Breddo cookers using a curd auger. Each slurry was blended in a weight ratio of 60:40 with Cheezkake Blend™. Each dairy slurry/cheese substitute blend was homogenized at 1500 psi before being packaged into double-walled shippers and transferred by conveyer to refrigerated storage. The specific slurry formulations are indicated in Table 8 below. Samples 1* and 2* were formulated to have approximately 57 percent total moisture, approximately 36 percent total fat, and pH of 4.7-4.99. Sweet cream used to standardize the acidified slurries was 45 percent fat and 50 percent total solids.

TABLE 8

Dairy Slurry Formulations

| | Sample | |
|---|---|---|
| Ingredient, wt % | 1* | 2* |
| Sweet cream | 66.67 | 66.67 |
| CMF | 0 | 7.50 |
| AMF | 0 | 0 |

TABLE 8-continued

Dairy Slurry Formulations

| | Sample | |
|---|---|---|
| Ingredient, wt % | 1* | 2* |
| Palm oil | 6.00 | 0 |
| NFDM | 3.90 | 3.66 |
| Sodium acid sulfate | 0.40 | 0.40 |
| Gum | 0 | 0.15 |
| Moisture, total | 57 | 57 |
| Fat | 36 | 36 |
| Homogenization of slurry | 800 psi | No |

Both Samples 1* and 2*, including their respective dairy slurry components, were stable and no fat separation was observed in these samples.

Example 7

Evaluations of Dairy Base Materials Made with Sodium Acid Sulfate in Modified Process After approximately 90 days refrigerated storage (at approx. 37° F.), textural observations of the dairy base material Samples 1* and 2* made according to Example 6 were conducted.

Sample 2* was slightly firmer than Sample 1*. Their texture was equally smooth in mouthfeel/melted away fast. In appearance, both were smooth, shiny and white in color. In terms of flavor, Sample 1* had a slight beanie, oily flavor, very slight acid, and was not salty. Sample 2* had a cleaner flavor, and more dairy notes, and was slight salty and slightly more acid than Sample 1*. Results of the product analyses that also were performed are set forth in Table 9 below. Moisture, fat, and salt contents, and also pH, were measured for samples of each dairy base material 1* and 2* as pulled at the start, middle, and end of the applicable production run.

TABLE 9

Dairy Base Material Sample Observations and Properties

| | % Moisture (5 hr vac) | % Fat Mojo | % Salt | pH |
|---|---|---|---|---|
| Sample 1* | | | | |
| 1* Start | 56.38 | 34.26 | 0.48 | 4.82 |
| 1* Middle | 55.66 | 34.43 | 0.48 | 4.79 |
| 1* End | 55.88 | 34.92 | 0.49 | 4.89 |
| Sample 2* | | | | |
| 2* Start | 55.24 | 34.81 | 0.47 | 4.75 |
| 2* Middle | 56.79 | 35.26 | 0.43 | 4.81 |
| 2* End | 56.43 | 34.75 | 0.51 | 4.81 |

Example 8

Evaluations of Dairy Base Materials Made with Sodium Acid Sulfate in Modified Process and in Sauces After approximately 14 days refrigerated storage, pH and firmness measurements were taken on samples of dairy base materials Samples 1* and 2* pulled at the start, middle and end of the production run. The results are provided in Table 10 below.

TABLE 10

Sample pH and Firmness data

| Sample | pH | Firmness (g) |
|---|---|---|
| 1* Beg | 4.83 | 606 |
| 1* Mid | 4.97 | 412 |
| 1* End | 4.85 | 269 |
| 2* Beg | 4.76 | 460 |
| 2* Mid | 4.72 | 229 |
| 2* End | 4.74 | 520 |

Samples 1* and 2* also were evaluated in Alfredo Sauces using the same sauce preparation procedure as in Examples 3 and 4, and having sauce formulations as indicated in Table 11 below. A control sauce containing heavy cream also was evaluated at the same time.

TABLE 11

Alfredo sauce formulations

| Ingredients | Sauce C2 Cream Control % | Sauce 5 Cream subst. 1* % | Sauce 6 Cream subst. 2* % |
|---|---|---|---|
| Full moisture Parmesan | 6.10 | 6.11 | 6.12 |
| Full moisture Romano | 2.65 | 2.65 | 2.64 |
| Sweet cream Blend | 0.00 | 34.89 | 31.84 |
| Water | 40.77 | 49.03 | 52.11 |
| Heavy Cream | 44.96 | 0.00 | 0.00 |
| Butter, unsalted | 0.00 | 3.48 | 3.47 |
| Food Starch | 4.26 | 2.47 | 2.46 |
| Garlic | 0.81 | 0.98 | 0.97 |
| Salt | 0.41 | 0.34 | 0.34 |
| Black pepper | 0.03 | 0.04 | 0.04 |
| Nut meg | 0.010 | 0.010 | 0.010 |
| Total | 100.00 | 100.00 | 100.00 |

Viscosity measurements of the sauces made with dairy base materials pulled at the start, middle and end of the production run gave the results indicated in Table 12 below. A viscosity measurement on the heavy cream control also was made. Samples 1* and 2* had viscosity data results showing similarity to control with the exception of Sample 2* which gave little higher viscosity in sauces prepared with samples pulled toward the end of the production run.

TABLE 12

Sauce Viscosity

| Sample Ingredient used | Viscosity (cP) |
|---|---|
| Heavy Cream (Control) | 474 |
| 1* Start | 483 |
| 1* Middle | 468 |
| 1* End | 453 |
| 2* Start | 467 |
| 2* Middle | 481 |
| 2* End | 573 |

Sensory evaluations also were performed on the sauces containing Samples 1* or 2*, and the control sauce, by five experienced sensory evaluators. The results are set forth in Table 13 below.

TABLE 13

Sensory Evaluation Results

| | Sauce C2 Sample used: Control | Sauce 5 Sample used: 1* | Sauce 6 Sample used: 2* |
|---|---|---|---|
| Panelist 1 | Creamy. No acidic note, less cheesy | Creamy, acidic note, good cheese flavor | More creamy, less cheesy |
| Panelist 2 | Slightly less flavor, less acidic, less salty, good viscosity | Smooth cheesy well balanced, preferred | Slightly less flavor, less salty |
| Panelist 3 | Balanced, slightly higher in dairy note than Sauce 6/Sample 2* | Slightly curdle texture, balanced, good creamy, dairy | Well balanced, creamy, no little bitter off notes |
| Panelist 4 | Slightly yellow color, slightly more viscous, fat on surface | Creamy, dairy, | Creamy, dairy preferred |
| Panelist 5 | Much dairy, very balanced | Creamy, dairy, acidic note | Dairy, slight acid note Preferred |
| Panelist 6 | Very close to Sauce 6/Sample 2*, mild | Creamy, little acid note | Creamy, Balanced Preferred |

Regarding the sensory evaluation results, sauce preparations with Samples 1* and 2* were determined by the evaluators to have excellent sensory attributes in comparison to the control.

Example 9

Cream Sauce Replacements Acidified with Mineral Acid

Cream sauce replacements, i.e., dairy base materials, were prepared using acidified dairy slurries with non-sour mineral acid and organoleptically evaluated. For each sample, an acidified dairy slurry was prepared which was then combined with full fat cream cheese to provide a dairy base material adapted to be a cream replacement product. The dairy based formulations that were prepared in this regard are set forth in Table 13 below. The procedure used to prepare each acidified dairy slurry was as follows: 1. Cream, water and NFDM were mixed with a Lightening mixer. 2. pH was adjusted with acidulant to target pH. 3. The mix was heated to 140° F. using MW heating. 4. The cream slurry was homogenized at 2000/500 psi. 5. The slurry was heated to 180° F. using a Thermomix food processor. 6. The slurry was collected into a beaker. The dairy base material preparation procedure used for each sample was as follows: 1. 60% acidified dairy slurry and 40% full fat cream cheese were mixed (to make one liter). 2. The resulting mixture was heated to 180° F. for 2 minutes. 3. Final pH was measured at 30 minutes, 1 hour, and 1 day (24 hrs.). The dairy base material products were stored under refrigerated conditions. The dairy base material products were evaluated for taste and texture after three days refrigerated storage. The sensory results also are indicated in Table 14. The cream ingredient used in these formulations comprised a fresh sweet cream composition with 39.92% Fat, 1.86% Protein, 45.82% TS, 5.59% SNF.

Example 10

Cream Sauce Replacement Acidified with ED Composition

A non-sour cream replacement, as a dairy base material, was prepared with an acidic ED water composition with a measured pH of 1.0 in accordance with the formulations described in Tables 15 and 16. "SNF" refers to solid non-fat content. The acidic ED water was prepared in accordance with Example 3 in United States Patent Application Publication No. 2005/0183955 A1, which descriptions are incorporated herein by reference.

The cream replacement was prepared according to the following procedure. A Thermomix food processor was used to make 1000 grams acidified dairy slurry according to the following sequence of steps: 1) added 360 grams anhydrous milkfat (AMF) plus 284 grams tap water; 2) heated to 120° F.; added 72.9 grams nonfat dry milk; 3) heated to 138° F.; added 284 grams "ED" water; and 4) heated to 172° F.

A Thermomix food processor was then used to make 1000 grams sweet cream replacement using the acidified dairy slurry according to the following procedure: 1) added 400 grams cream cheese substitute (Cheezkake Blend™), which comprised 54.5% water, 34.0% fat and 11.5% SNF; 2) added 600 grams heated, acidified slurry; 3) heated combined product to 172° F.; and 4) homogenized at 1500 psi (double-staged 1000/500 psi).

TABLE 15

Non-Sour Cream Replacement Formulation

| % Ingredient | Ingredient | % Water | % Fat | % SNF |
|---|---|---|---|---|
| 60.00 | Slurry (S-A) | 34.2 | 21.6 | 4.2 |
| 40.00 | Cream Cheese Substitute (CCS-B) | 21.8 | 13.6 | 4.6 |
| 100.00 | Non-Sour Cream Replacement product | 56.0 | 35.2 | 8.8 |

TABLE 14

Cream Sauce Replacements with Mineral Acid

| Ingredient | Sample 1-MA % | Sample 2-MA % | Sample 3-MA % | Sample 4-MA % |
|---|---|---|---|---|
| Cream (40% fat)* | 89.98 | 89.98 | 89.98 | 89.98 |
| Water | 7.53 | 7.53 | 7.53 | 7.53 |
| NFDM | 2.09 | 2.09 | 2.09 | 2.09 |
| sodium bisulfate | 0.4 | 0 | 0.4 | 0 |
| 6.25 N HCL | 0 | 0.4 | 0 | 0.4 |
| Total | 100 | 100 | 100 | 100 |
| target pH @ R.T. | 4.7 | 4.7 | 4.4 | 4.4 |
| Dairy Slurry pH/temp | 4.69/55.9 F. | 4.76/44.1 F. | | 4.44/52.9 F. |
| Dairy Slurry pH/F. (1 Day) | 4.77/41 F. | 4.62/41.5 F. | 4.63/40.4 F. | 4.47/39.8 F. |
| Taste (3 day) | good | Good | sl. Off | not sour |
| Dairy base mat'l | 4.7/81.9 F. | 4.77/66.2 F. | | 4.61/68.5 F. |
| Dairy base mat'l (1 day) | 4.87/41.3 F. | 4.85/41.4 F. | 4.8/39.4 F. | 4/73/37.3 F. |
| Taste (3 day) | Good | Good | sl. Off | good |
| Texture (3 day) | Sauce like | Sauce Like | too thick, cc like | sauce like |
| Moisture (3 day) | 54.69 | 54.62 | 54.41 | 54.8 |

TABLE 16

S-A (Slurry) Formulation

| % Ingredient | Ingredient | % Water | % Fat | % SNF |
|---|---|---|---|---|
| 36.00 | Anhydrous Milkfat | — | 36.0 | — |
| 7.29 | Nonfat Dry Milk | 0.29 | — | 7.0 |
| 28.36 | Tap Water | 28.36 | — | — |
| 28.35 | ED composition (pH 1.0) | 28.35 | — | — |
| 100.00 | Slurry | 57.00 | 36.0 | 7.0 |

The in-process pH values measured for various ingredients and products are set forth in Table 17.

TABLE 17

In-Process pH

| Material | pH |
|---|---|
| Tap water | 7.33 |
| AMF, tap water, NFDM | 5.87 |
| Acidified Dairy slurry | 4.66 |
| Cream Cheese Substitute | 4.58 |
| Sweet Cream Replacement product | 4.53 |

Organoleptic evaluations conducted on the sweet cream replacement product gave the following results: texture was smooth; body was slight viscous; color was creamy white; and flavor was clean dairy note, very slight acidic taste.

Example 11

Stabilized Non-Sour Cream Type Product Prepared without Cheese Composition and Acidified with ED Composition A stabilized non-sour cream type product was prepared with an ED water composition and without including a cheese composition ingredient, in accordance with the formulation described in Table 18. The ED water composition used was identical to that used in Example 10. As the general preparation procedure used, concentrated milkfat at 80% fat and NFDM were diluted to 42% fat with tap water and ED composition to make an extended shelf life sweet cream type product. More particularly, a Thermomix food processor was used to make a stabilized sweet cream type product according to the following procedure: 1) added 525 grams anhydrous milkfat (AMF) plus 250 grams tap water; 2) heated to 120° F.; added 46.6 grams nonfat dry milk; 3) heated to 130° F.; added 178.4 grams ED composition; and 4) heated to 175° F.

TABLE 18

Stabilized Non-Sour Cream Type Product

| % Ingredient | Ingredient | % Water | % Fat | % SNF |
|---|---|---|---|---|
| 52.5 | Concentrated Milkfat (CMF - 80% fat) | 9.975 | 42.0 | 0.525 |
| 4.66 | Nonfat Dry Milk (NFDM) | 0.185 | — | 4.475 |
| 25.0 | Tap Water | 25.0 | — | — |
| 17.84 | ED Composition | 17.84 | — | — |
| 100.00 | Stabilized Non-Sour Cream Type Product (42% Fat) | 53.0 | 42.0 | 5.0 |

The in-process pH values measured for various ingredients and product are set forth in Table 19.

TABLE 19

In-Process pH

| Material | pH |
|---|---|
| Tap water | 7.2 |
| CMF, tap water, NFDM | 6.8 |
| ED composition | 1.0 |
| Stabilized Non-Sour Cream Type Product | 4.8 |

Organoleptic evaluations conducted on the non-sour cream type product revealed that the product had a clean, sweet cream flavor, not at all sour.

Tables 20 and 21 below set forth several exemplary envisioned sweet cream replacement compositions comprising emulsified blends of the non-sour cream type product such as described above and cream cheese substitute.

TABLE 20

| % Ingredient | Ingredient | % Water | % Fat | % SNF |
|---|---|---|---|---|
| 95.0 | Stabilized non-sour cream type product | 50.35 | 39.9 | 4.75 |
| 5.0 | Cream cheese substitute | 2.73 | 1.70 | 0.57 |
| 100.0 | Blend, Total | 53.08 | 41.6 | 5.32 |

TABLE 21

| % Ingredient | Ingredient | % Water | % Fat | % SNF |
|---|---|---|---|---|
| 50.0 | Stabilized non-sour cream type product | 27.25 | 17.0 | 4.75 |
| 50.0 | Cream cheese Substitute | 26.5 | 21.0 | 2.5 |
| 100.0 | Blend, Total | 53.75 | 38.0 | 7.25 |

While the invention has been particularly described with specific reference to particular process and product embodiments, it will be appreciated that various alterations, modifications and adaptations may be based on the present disclosure, and are intended to be within the spirit and scope of the present invention as defined by the following claims.

What is claimed is:

1. A stabilized non-sour dairy base material comprising a dairy emulsion which comprises a dairy cream, a fat source, from about 3 to about 5 weight percent of a protein source, and a non-sour acidulant selected from the group consisting of edible metal acid salts of inorganic acids, edible inorganic acids, and combinations thereof, the base material with a pH between about 4.7 and about 5.0 and a shelf-life of at least about 30 days under refrigerated conditions, wherein the dairy base material has a total organic acid content of 0.22 moles per 1000 grams of dairy base material or less.

2. The stabilized non-sour dairy base material of claim 1, wherein the non-sour dairy base material has a shelf-life of at least about 120 days under refrigerated conditions and which comprises a total fat content of about 25 to about 65 percent and a total moisture content of about 35 to about 75 percent.

3. The stabilized non-sour dairy base material of claim 1, further comprising a cheese component.

4. The dairy base material of claim 3, wherein the non-sour acidulant is an edible metal acid salt of an inorganic acid selected from the group consisting of sodium bisulfate, potassium bisulfate, calcium bisulfate and mixtures thereof.

5. The dairy base material of claim 3, wherein the non-sour acidulant is an edible inorganic acid selected from the group consisting of hydrochloric acid, sulfuric acid, and mixtures thereof.

6. The dairy base material of claim 3, wherein the base material is a dairy emulsion and the dairy emulsion is combined with the cheese component in a weight ratio of about 40:60 to about 100:0, respectively.

7. The dairy base material of claim 3, wherein the dairy base material comprises about 30 to about 75 percent moisture, about 11 to about 65 percent fat, and optionally about 4 to about 5 percent lactose.

8. The dairy base material of claim 3, wherein the stabilized dairy base material has a shelf life of at least about one-hundred twenty (120) days under refrigerated conditions.

9. The dairy base material of claim 3, wherein the base material is a dairy emulsion and the dairy emulsion and cheese component are a homogenized blend.

10. The dairy base material of claim 3, further comprising a gum.

11. The dairy base material of claim 3, wherein the cheese component comprises a cream cheese substitute.

12. The dairy base material of claim 2 wherein the cream comprises protein.

13. The dairy base material of claim 12 wherein the base material comprises from about 65 to about 80 weight percent cream, and about 5 to about 8 weight percent fat.

14. The dairy base material of claim 13 wherein the cream comprises from about 55 weight percent fat, from about 1 to about 2 weight percent protein and from about 3 to about 4.5 weight percent lactose.

15. A stabilized non-sour dairy base material comprising a dairy emulsion which comprises a dairy cream, a fat source, from about 3 to about 5 weight percent of a protein source, and a non-sour acidulant selected from the group consisting of edible metal acid salt of an inorganic acid, an edible inorganic acid, and combinations thereof, the base material with a pH between about 4.4 and about 5.0 and a shelf-life of at least about 30 days under refrigerated conditions, wherein the edible metal acid salt of an inorganic acid is selected from the group consisting of an edible alkali earth metal acid salt, an alkaline earth metal acid salt, sodium bisulfate, sodium hydrogen sulfate, sodium acid sulfate, potassium bisulfate, potassium hydrogen sulfate, calcium bisulfate, calcium hydrogen sulfate, acidified calcium sulfate, magnesium bisulfate, magnesium hydrogen sulfate, magnesium acid sulfate and mixtures thereof, and wherein the edible inorganic acid is selected from the group consisting of food grade hydrochloric acid, food grade sulfuric acid and mixtures thereof and wherein, wherein the dairy base material has a total organic acid content of 0.22 moles per 1000 grams of dairy base material or less.

16. The dairy base material of claim 15 wherein the cream comprises protein.

17. The dairy base material of claim 16 wherein the base material comprises from about 65 to about 80 weight percent cream, and about 5 to about 8 weight percent fat.

18. The dairy base material of claim 17 wherein the cream comprises from about 55 weight percent fat, from about 1 to about 2 weight percent protein and from about 3 to about 4.5 weight percent lactose.

* * * * *